J. McCONN.
COFFEE-POT.

No. 174,272. Patented Feb. 29, 1876.

Witnesses
F. Frank Hartman
Jas. B. Connolly

Inventor
John McConn
By Connolly Bros., Attorneys

UNITED STATES PATENT OFFICE.

JOHN McCONN, OF PHILADELPHIA, PENNSYLVANIA.

IMPROVEMENT IN COFFEE-POTS.

Specification forming part of Letters Patent No. 174,272, dated February 29, 1876; application filed October 31, 1874.

*To all whom it may concern:*

Be it known that I, John McCONN, of Philadelphia, in the county of Philadelphia and State of Pennsylvania, have invented certain new and useful Improvements in Coffee and Tea Pots; and I do hereby declare the following to be a full, clear, and exact description of the invention, such as will enable others skilled in the art to which it pertains to make and use it, reference being had to the accompanying drawings, which form part of this specification, in which—

Figure 1:
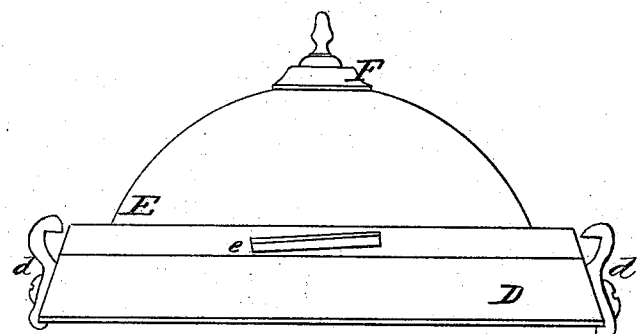
Figure 2:
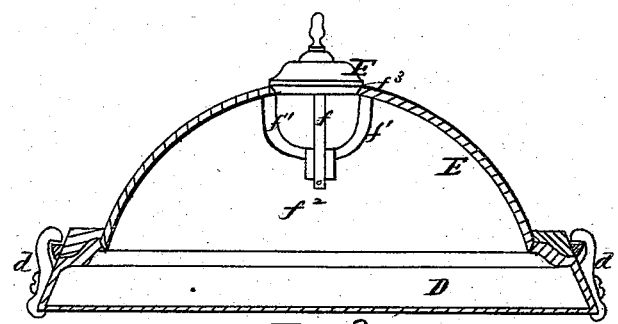
Figure 3:
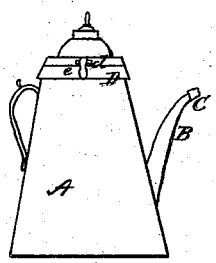

Figure 1 is a side view of lid. Fig. 2 is a vertical central section through same. Fig. 3 is a side view of a coffee-pot provided with my improvement.

My invention has for its object to prevent tea, coffee, and other beverages from losing their aroma in the process of making, drawing, boiling, or decoction.

My invention consists in furnishing tea and coffee pots and urns, as also similar vessels, with a steam-tight lid and safety-valve, constructed as hereinafter described and as specifically set forth in the claim.

In carrying my invention into effect, I make the lid of any suitable metal, as brass or britannia, and fasten it to the pot, urn, or other vessel by means of lugs and inclines or other equivalent fastening, the lower edge of said lid, as well as the upper edge of the vessel or rim forming such edge, being ground or otherwise constructed to form a steam tight joint. In the center of the lid I place a valve, specifically as hereinafter described and claimed, weighted sufficiently to keep shut by gravity except when raised by strong pressure beneath.

Referring to the accompanying drawing, A shows a coffee-pot with my improvements attached. B is the spout, provided with a cap, C, to prevent the escape of steam or vapor at this point. D is an annular ring or collar of suitable metal secured to the upper part of the vessel A by soldering, or any other means that will prevent the escape of steam between said ring and the vessel. $d\ d$ are lugs formed on or secured to the ring D by screws or otherwise. E is the lid, provided with inclines $e\ e$, which serve to fasten it securely in place when it is turned around to bring said inclines under the lugs $d\ d$, as shown in the drawing. The upper edge of the ring D and the lower edge of the lid E are ground so as to form a perfectly steam-tight joint at the junction of said ring and lid. Instead of a flat-ground joint, a V or other equivalent steam-tight joint may be substituted, and in cases where the coffee or other liquid is poured or allowed to escape from a vessel having a cock or faucet, the cap C may obviously be dispensed with. F is the valve, having a stem, $f$, moving in bearings $f^1$ and provided with a pin, $f^2$, to limit its upward movement and prevent its coming out of place or being lost. The valve F has a seat at $f^3$, and is sufficiently weighted (or it may be held down by an equivalent spring) to retain its closed position by gravity, except under considerable pressure from beneath.

With a vessel thus constructed a very superior decoction may be made, the aroma arising from the boiling liquid being prevented from escaping except when necessary relief is afforded by the rising of the valve.

As already remarked, the improvements may be applied to tea and coffee pots and urns and culinary vessels of all descriptions, where it is desirous to retain the aroma or flavor of the article being cooked.

I do not claim, broadly, the provision of a valve in the upper part of a coffee or tea pot which will be raised by the pressure of steam, as I am aware that the same has been already employed for the purpose of admitting water at a certain period of the boiling process from a supplementary vessel above the coffee receptacle. My invention is confined to a valve which, when the pressure within the boiler becomes too great, will open and allow the steam to escape automatically.

What I claim as my invention is—

The combination of the ring D, having lugs $d\ d$, and the lid E, having the lateral inclines $e$ and central safety-valve F, substantially as shown and described.

In testimony that I claim the foregoing I have hereunto set my hand this 29th day of October, 1874.

JOHN McCONN.

Witnesses:
I. FRANK HARTMAN,
JNO. A. BELL.